US010094680B2

(12) United States Patent
Bailiang

(10) Patent No.: US 10,094,680 B2
(45) Date of Patent: Oct. 9, 2018

(54) DYNAMICALLY CONTROLLING MAP VIEWPORT IN VIEW OF USER SIGNALS

(71) Applicant: GOOGLE INC., Mountain View, CA (US)

(72) Inventor: Zhou Bailiang, Blagowlah (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/097,122

(22) Filed: Apr. 12, 2016

(65) Prior Publication Data

US 2016/0298982 A1 Oct. 13, 2016

Related U.S. Application Data

(60) Provisional application No. 62/146,730, filed on Apr. 13, 2015.

(51) Int. Cl.
*G01C 21/36* (2006.01)
*G06F 17/30* (2006.01)

(52) U.S. Cl.
CPC ..... *G01C 21/367* (2013.01); *G06F 17/30241* (2013.01)

(58) Field of Classification Search
CPC ........................ G01C 21/367; G06F 17/30241
See application file for complete search history.

(56) References Cited

U.S. PATENT DOCUMENTS

| | | | |
|---|---|---|---|
| 7,995,079 B2 | 8/2011 | Bells et al. | |
| 8,600,619 B2 | 12/2013 | Bales et al. | |
| 8,954,860 B1 | 2/2015 | Hands et al. | |
| 2009/0319616 A1* | 12/2009 | Lewis, II | H04W 24/00 709/206 |
| 2013/0103313 A1* | 4/2013 | Moore | G01C 21/20 701/533 |
| 2014/0100780 A1* | 4/2014 | Caine | G01C 21/32 701/533 |

OTHER PUBLICATIONS

Geospatial Training & Consulting et al., "Google Maps API," (2006). Retrieved from the Internet at: URL://www.geospatialtraining.com/GoogleMaps/Book/Google%20Maps%20API%20v2.pdf.
International Search Report and Written Opinion for Application No. PCT/US2016/027116, dated Sep. 8, 2016.
International Preliminary Report on Patentability for Application No. PCT/US2016/027116, dated Oct. 17, 2017.

* cited by examiner

*Primary Examiner* — Michael D Lang
(74) *Attorney, Agent, or Firm* — Marshall, Gerstein & Borun LLP

(57) ABSTRACT

A non-transitory computer-readable medium stores instructions that implement an application programming interface (API) for generating digital maps. When invoked by a software module executing on one or more processors of a client device, the API operates to (i) determine a geographic location to be included in a digital map, where the geographic location is specified by a server device coupled to the client device via a communication network, (ii) select a parameter for a viewport of the digital map based at least on a distance from a current location of the client device to the specified geographic location, (iii) generate the digital map in accordance with the selected parameter, and display the digital map via a user interface of the client device.

20 Claims, 6 Drawing Sheets

DYNAMICALLY CONTROLLING MAP VIEWPORT IN VIEW OF USER SIGNALS

FIELD OF THE DISCLOSURE

The present disclosure relates to interactive digital maps and, more particularly, to determining parameters of a viewport within which a digital map is displayed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a variety of computing devices, including many portable devices, support software applications that display interactive digital maps. A user using one of these computing devices may operate a software application, such as a web browser, to visit a digital map provider to view an interactive digital map. Further, many providers of web content, such as for example retailers that operate brick-and-mortar stores, include digital maps in their content. To this end, the instructions on a web site can invoke an application programming interface (API) of the digital map provider. Still further, a user sometimes may wish to share his or her geographic location with another user, and embed a digital map in an email message, for example. In these and similar situations, a digital map is usually centered around a certain location and has a certain zoom level, i.e., level of magnification.

SUMMARY

A digital map provider causes several client devices to display digital maps including a certain geographic location at different zoom levels, depending on respective relationships between the current locations of the client devices and the indicated geographic location and/or respective relationships between the users of the client devices and the indicated geographic locations. Thus, for example, when a user of a client device shares her current geographic location in Paris with a friend in Paris and another friend in the United States, the digital map provider can automatically provide a relatively zoomed-in digital map depicting the neighborhood in Paris to the friend in Paris, and a relatively zoomed-out digital map depicting Paris on the map of France to the friend in the United States. As another example, the web site of a furniture store can embed a digital map to illustrate the location of the store, and different users accessing the web site will see the map at different zoom levels depending on their estimated distance to the store.

In one particular embodiment of these techniques, a non-transitory computer-readable medium stores instructions that implement an application programming interface (API) for generating digital maps. When invoked by a software module executing on one or more processors of a client device, the API operates to (i) determine a geographic location to be included in a digital map, where the geographic location is specified by a server device coupled to the client device via a communication network, (ii) select a parameter for a viewport of the digital map based at least on a distance from a current location of the client device to the specified geographic location, (iii) generate the digital map in accordance with the selected parameter, and display the digital map via a user interface of the client device.

Another embodiment of these techniques is a method for generating digital maps, which can be executed on one or more processors. The method includes receiving a request to provide an indication of a certain geographic location to a first device operated by a first user and a second device operated by a second user, determining a first distance between the indicated geographic location and a geographic location of the first device and a second distance between the geographic location and a geographic location of the second device, determining a first zoom level for a digital map including the geographic location, based at least in part on the first distance, determining a second zoom level for a digital map including the geographic location, based at least in part on the second distance, and causing a first digital map to be displayed via the first device at the first zoom level, and a second digital map to be displayed via the second device at the second zoom level.

Yet another embodiment of these techniques also is a method for generating digital maps, which can be executed on one or more processors. The method includes receiving, by one or more processors from a source device operated by a location sharing user, a request to share an indication of a certain geographic location with a first target user operating a first target device and a second target user operating a second target device and determining, by the one or more processors, a first relationship between the first target user and the indicated geographic location and a second relationship between the second target user and the indicated geographic location. The method further includes determining, by the one or more processors, a first viewport parameter for a first digital map including the indicated geographic location, based at least in part on the first determined relationship and determining, by the one or more processors, a second viewport parameter for a second digital map including the indicated geographic location, based at least in part on the second determined relationship. Still further, the method includes causing, by the one or more processors, a first digital map to be displayed via the first device according to the first viewport parameter, and a second digital map to be displayed via the second device according to the second viewport parameter.

DETAILED DESCRIPTION

Overview

Figure 1:
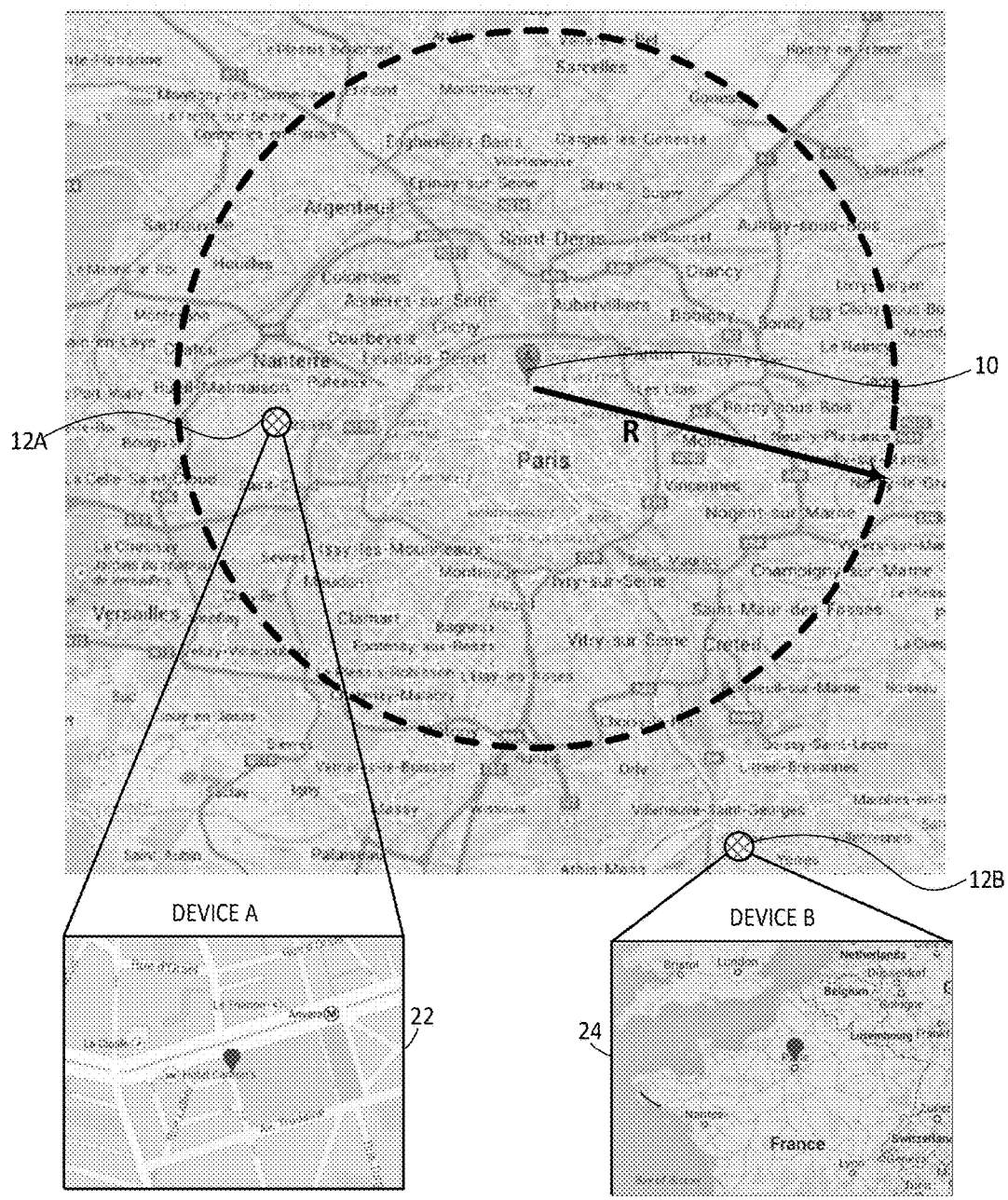
FIG. 1 schematically illustrates an example scenario in which map viewports are dynamically controlled in view of user signals.

A third-party content provider, which can be a merchant or social networking service, for example, can provide a resource that embeds a digital map of a geographic area via a mapping Application Programming Interface (API) of an online map provider. The resource can be a website, an email message, or any other suitable type of an electronic document. When two different users access the resource, the mapping API and/or another suitable software component determines the parameters of the map viewport in view of user- and/or device-specific signals. For example, if the website of the San Diego Zoo includes a call to the mapping API to illustrate the location of the zoo on a digital map, the mapping API can display the map at a relatively high zoom level to a user who is accessing the website from within the general vicinity of San Diego, and can show the map at a relatively low zoom level to a user who is accessing the website from San Francisco, because a local user is more likely to be interested in a local perspective. In this manner, the mapping API can increase the likelihood that the map includes content relevant to the user.

The mapping API also can set a default zoom level. For example, a provider of the resource that invokes the mapping API can specify the default zoom level and, in some implementations, can specify the conditions for overriding the default zoom level.

In some cases, the resource of a third-party content provider includes a reference to a geographic location but does not include a call to the mapping API. For example, the reference can be an address including the number of a building, the name of the street, and the name of the town. The address can be included in the body of an email, in a text message, or on a web site. When a user accesses the resource from a device in which the mapping API is installed, the mapping API can automatically identify a reference to a geographic location. Thus, the mapping API can be referenced in content from by a third-party content provider and/or automatically invoked by a user device processing the content.

As another example, a user in Sydney may wish to share her location with several friends, via a social networking service that invokes the mapping API or triggers the mapping API by referencing geographic locations. When a friend in Sydney checks her location via the social networking service, the map provider can generate a map of the neighborhood Sydney that includes the user's current location and display a marker at that location. However, when a friend in Paris performs a similar check, the map provider can generate a map of Australia and place the marker in Sydney, because to this friend the information about the user's location within Sydney probably would seem unnecessary.

In addition to the user's location as it relates to the location on the map, the mapping API can process other user-specific signals such as the estimated level of familiarity with the area or personal preferences, for example, when this information is available (in some embodiments, the user also operates certain controls and/or installs certain applications to allow the map provider to personalize the map in this manner). The mapping API can obtain the location of the device at which the digital map is rendered using, for example, the user log-in information and/or the IP address of the device.

For ease of explanation and illustration, dynamic determination of map viewport parameters is discussed below primarily with reference to a mapping API of an online map provider. More generally, however, this or similar functionality can be provided in any suitable software component, such as in a special-purpose mapping application, for example. Thus, two instances of a mapping software application executing on two separate user devices can automatically display digital maps to depict the same geographic location at different zoom levels in response to determining respective distances between the user devices and the geographic location.

In some cases, the mapping API executing on a user device determines the distance between the user device and a geographic location by querying a map server of the map provider. The mapping API also can query the map server to determine the zoom level or another map viewport parameter when the map server has better access to some of the relevant information, such as the user's profile. References to the mapping API selecting or determining viewport parameters should be understood to include the implementations when the mapping API determines the parameters locally, when the mapping API determines the parameters by querying a map server, or when the mapping API determines the parameters by cooperating with the map server, unless indicated otherwise.

Thus, according to the techniques of this disclosure, a software component selects parameters for a viewport in which a digital map is rendered in view of user- and device-specific signals. These signals can include the distance between the geographic location at which the digital map is centered (or around which the digital map is otherwise organized) and the geographic location of the device rendering the digital map. The software component can be at least partially implemented in a mapping API or in a special-purpose software application.

Example Scenarios

FIG. 1 schematically illustrates an example scenario in which devices A and B at locations 12A and 12B, respectively, access a resource that embeds a digital map of a location 10 in Paris, France, using an API of an online map provider. User Alice operates device A, which can be a desktop computer, and user Bob operates device B, which can a smartphone, for example. The resource in this scenario is a web site maintained by a restaurant, which includes content in a markup language such as HTML. The content can include text and multimedia files describing the menu, the reviews, etc., as well as instructions to illustrate the location of the restaurant on a digital map.

The operator of the restaurant can reasonably expect the visitors to the restaurant web site to include those who live in the city, and thus are probably interested in precise directions, as well as those who live far, possibly in other countries, and may be interested in the more general location of the restaurant. To allow different web site visitors to view the location of the restaurant on a digital map in view of the visitors' locations and/or other user- or user device-specific signals, the operator includes in the web site content a reference to an API of an online provider of digital maps ("mapping API"), implemented according to the techniques of this disclosure.

In operation, a web browser application on each of the devices A and B accesses the web site and executes the respective instance of the instructions that implement the mapping API. The mapping API can dynamically determine map viewport parameters at devices A and B in view of the locations 12 and 14 in relation to location 10. Because location 12A is within a certain radius R of location 10, such as 20 km, for example, device A displays a digital map 22 including location 10 at a relatively high zoom level. However, because location 12A is outside the radius R, device B displays a digital map 24 including location 10 at a relatively low zoom level. In particular, the digital map 22 is a map encompasses only several city blocks and illustrates such geographic features as the names of nearby streets, the nearest subway station, the nearest hotel, etc. The location 10 accordingly is illustrated with a high degree of precision, so that the user of device A can determine, by looking at the digital map 22, the city block of location 10 and even the side of the street. In contrast, the digital map 24 depicts almost the entire country of France and illustrates only major geographic features such as country borders, large cities, major highways, etc. The location 10 is illustrated with a low degree of precision. The user of device B can determine only that location 10 is in Paris, without being able to determine a more precise location by looking at the digital map 24.

If desired, the operator of the restaurant web site can specify a default value for zoom level of the digital map. If a visitor to the restaurant web site does not indicate her location, or when the distance between the current location of the visitor and the restaurant cannot be determined for some other reason, the mapping API can generate a digital map at the default zoom level.

As another example, user Alice can share her current location via her smartphone with user Bob, who happens to be operating his tablet computer. Depending on Bob's current and/or permanent location relative to Alice's location, the mapping API of this disclosure can cause a digital map illustrating Alice's location to appear at a low zoom or a high zoom level on Bob's computer. As a more specific example, if Bob is in the same general neighborhood (e.g., within a one-mile radius) as Alice, the mapping API can provide a digital map covering only four city blocks, with Alice's location illustrated as precisely as possible. If Bob is in the same city as Alice but not in the same general neighborhood, the mapping API can provide a digital map covering the entire city, with Alice location illustrated more approximately. And if Bob is not even in the same city as Alice, the mapping API can provide a digital map covering a relatively large geographic area, such as a county, state, province, or even country, and indicate Alice's location with a marker placed over or next to the city label.

In these scenarios, Alice either does not control the zoom level at which her shared location will be depicted on Bob's computer or provides only a suggested zoom level, which the mapping API then overrides. Although Bob can subsequently adjust the zoom level of the map, if desired, the mapping API provides a digital map at the zoom level that is likely to be convenient for Bob. Moreover, the automated selection of the zoom level can by itself immediately communicate to Bob the distance to Alice's current location.

Further, in addition to controlling the zoom level, the mapping API of this disclosure can control other viewport parameters, such as automatically centering the viewport differently depending on the distance between Alice's and Bob's location (or the respective locations of devices A and B relative to location 10 in the example above), automatically selecting map styling features depending on the distance, automatically selecting map layers to be displayed in the viewport, etc.

As yet another example, Alice also can share her location with user Charlie, whose current location may be far from Alice's current location. However, because Charlie's home location is near Alice's current location, the mapping API can provide a digital map covering only several city blocks to Charlie, similar to the situation where Charlie's current location is close to Alice's current location. In this case, the map provider accessed via the mapping API can estimate that Charlie is likely familiar with the neighborhood where Alice is located, and accordingly cause the mapping API to provide a more precise indication on a zoomed-in digital map. In various implementation, the map provider and/or the mapping API can utilize any number of user- and device-specific signals, such as the current location, a frequented or otherwise probable location, an estimated level of familiarity with the area, previous geographic searches related to the area, other expressions of interest in the area, etc. The map provider and/or the mapping API can assign weights to these signals according to any suitable scheme.

Example System and Devices

Figure 2:
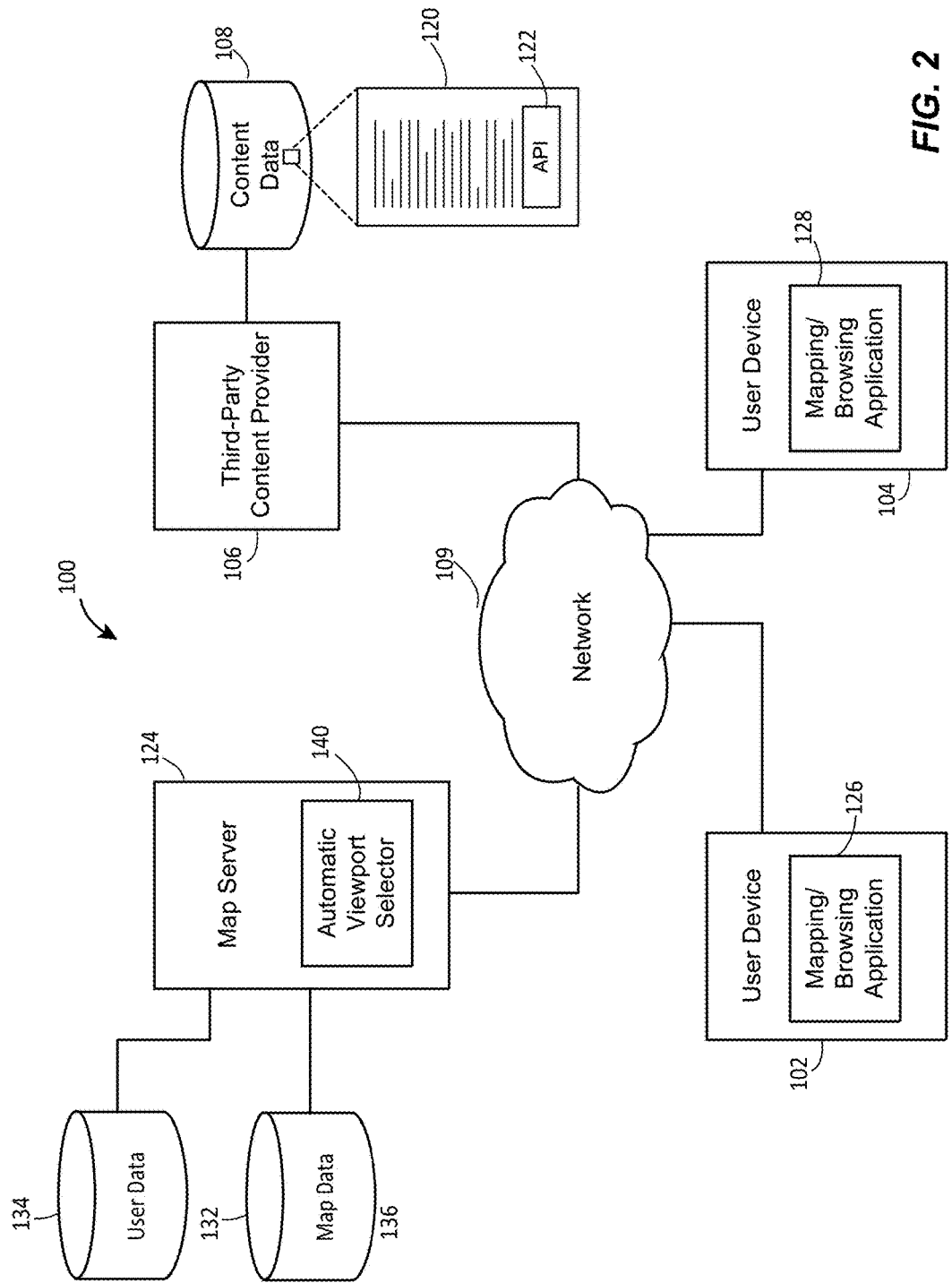
FIG. 2 is a block diagram of an example system in which techniques for controlling map viewports can be implemented.

FIG. 2 is a block diagram of an example system 100 in which these and other techniques for dynamically controlling map viewport parameters in view of user-specific signals can be implemented. The system 100 includes example user devices 102 and 104, each of which can be, for example, a smartphone, a tablet computer, a personal digital assistant, a laptop computer, etc. The user devices 102 and 104 can access a third-party content provider 106 via a communication network 109, which can include any suitable number of topology of wired and/or wireless links forming a local-area network or a wide-area network such as the Internet. The server 106 operated by a third-party content provider can be coupled to a content database 108 that stores text, images, audio files, etc. that make up content provided to client devices, including the user devices 102 and 104. The third-party provider can be a broadcaster, a business, a social media network, etc.

Example content 120 includes HTML instructions and a call to a mapping API 122 of an online map provider. The online map provider can operate one or more map servers 124 that provide map data and, in some embodiments, geographic business data or other geospatial data to client devices. Depending on the implementation, the content 120 incorporates all of the instructions that implement the mapping API 122, some of the instructions that implement the mapping API 122 (with the rest of the instructions stored on a remote device such as the map server 124) or only a reference to a remote location where the instructions implementing the mapping API 122 are stored (again, such as the map server 124) in the form of a URL, for example. As a more specific example of the latter implementation, the content 120 can specify a web server where the instructions are located, the name of a file storing the instructions, the format of the file (e.g., JavaScript) and parameters that are supplied to the instructions. The parameters can include an identifier of a geographic location (e.g., "123 Main St., Springfield") and the default zoom level, for example. Respective instances of web browser applications 126 and 128 execute on the user devices 102 and 104 and retrieve the content 120. The web browser applications 126 and 128 need not be instances of the same software, and can come from the same provider or different providers of software. When the web browser applications 126 and 128 invoke the mapping API 122 as specified in the content 120, the devices 102 and 104 request map data from the map server 124.

The mapping API 122 can be implemented as one or several functions, a data structure, a messaging scheme, etc. Further, in some embodiments, the mapping API 122 includes compiled code that executes directly on the processor(s) of the user device. In other embodiments, the instructions of the mapping API 122 are in a scripting language interpreted at runtime by the web browser on the user device.

Depending on the implementation, the map server 124 can be a single computing device having a memory and one or more processors that execute instructions stored in the memory, a pool of such devices (each capable of processing a request for data), a hierarchical set of front-end and back-end servers, etc. For ease of explanation, however, FIG. 2 schematically illustrates the map server 124 as a single device.

The map server 124 can operate on map data stored in a map database 132 to generate interactive digital maps. The map server 124 in some scenarios can also utilize user data stored in a user profile database 134. In particular, the map server 124 can implement an automatic viewport selector 140 as a set of software instructions stored in a non-transitory computer-readable memory and executed by one or more processors. The automatic viewport selector 140 can receive a request from the user device, generated upon executing the mapping API 122, determine map viewport parameters based on signals specific to the user device and/or the user of the user device, and generate an interactive digital map using the map database 132 and, in some cases, the user profile database 134. Example operation of the automatic viewport selector 140 is discussed in more detail below.

The data in the map database 132 can correspond to various types of geographic data including topographical data, street data, urban transit information, traffic data, etc. The geographic data in turn may be schematic or based on photography, such as satellite imagery. The data in the map database 132 can conform to any suitable format including a raster format and a vector graphics format, for example. Generally speaking, an image in a raster format specifies which colors are applied to various pixels that make up an image, whereas a graphic in a vector graphics format includes mathematical descriptions of points and various shapes (e.g., a line can be specified using a vector graphics format as two endpoints and an indication of thickness and color). In some implementations, data in the map database 132 may be organized into regular sized component images, or "tiles" corresponding to a certain zoom level.

The data in the user profile database 134 can include user's preferences, the information users chose to store as part of their personal profiles (e.g., home location, work location, favorite locations). In some implementations, the data in the database 134 can include overlays users have created on their interactive digital map (e.g., shapes, polylines, symbols, etc.) to indicate points of interest (or areas of interest such as neighborhoods), users' preference for certain map layers to be displayed (e.g., traffic layer, transit layer, weather layer, etc.), users' styling preferences (e.g., changing the visual display of such map elements as roads, parks, urban areas, etc.), etc. The map server can access appropriate records within the user profile database 134 using authentication information, such as a login and a password.

Figure 3:
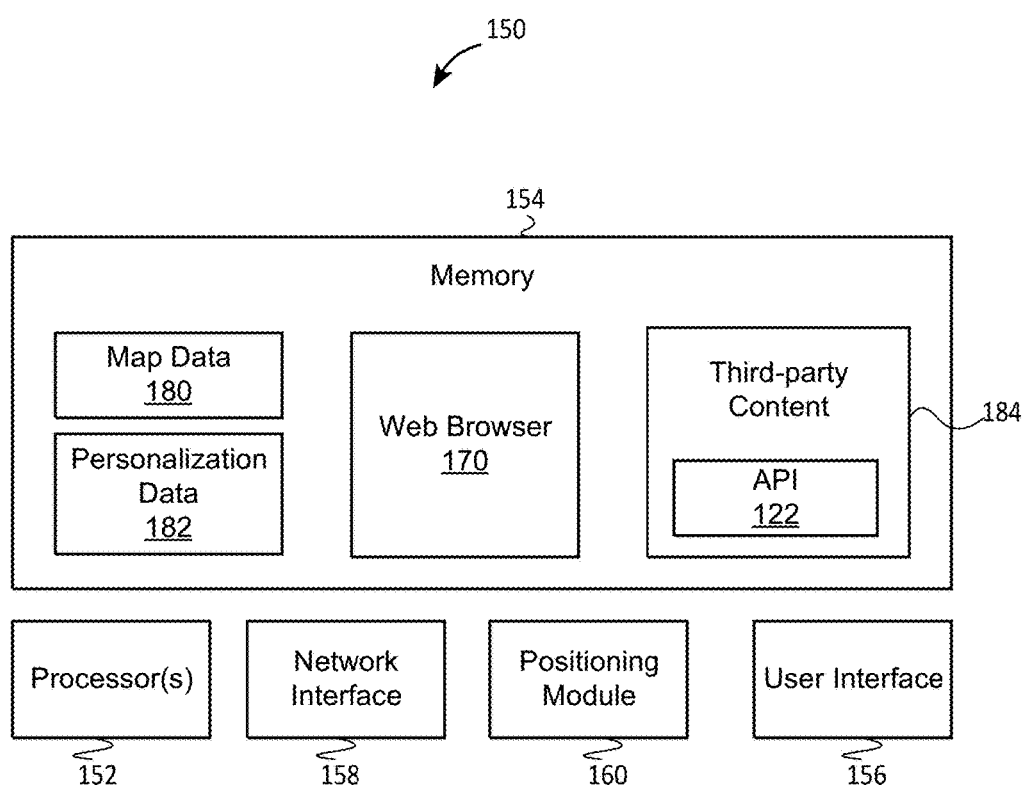
FIG. 3 is block diagram of an example client device that can operate in the system of FIG. 2.

Each of the user devices 102 and 104 can be implemented similar to a user device 150 illustrated in FIG. 3. The user device can be a desktop computer, a laptop computer, a tablet computer, a smartphone or another handheld device, or any other device via which a user can view a digital map. The user device 150 includes one or more processors 152 such as central processing units (CPUs), a computer-readable memory 154, a user interface 156, a network interface 158, and a positioning module 160. More generally, the computing device 150 can include any suitable number of processors and, if desired, one or more graphics processing units (GPUs) as well as other processing units. The memory 154 can be a computer-readable, tangible, non-transitory storage device and can include both persistent (e.g., a hard disk, a flash drive) and non-persistent (e.g., RAM) memory components. The memory 154 stores instructions executable on the processor(s) 152 that make up a web browser application 170, which can be similar to the web browser application 126 or 128 discussed with reference to FIG. 2. The memory 154 also can store map data 180, personalization data 182, and third-party content 184, which invokes the mapping API 122 discussed with reference to FIG. 2.

The user interface 156 can include a touchscreen or a display device along with a separate input device such as a keyboard. More generally, the user interface 156 can include any suitable number and type of components for receiving user input and generating output for a user. The network interface 158 can include a wired and/or a wireless communication module for communicating via short-range and/or long-range communication links. The positioning module 160 can include one or more of a Global Positioning System (GPS) receiver, a wireless local area network receiver capable of detecting the current location of the device 150 by triangulation, a proximity sensor, etc.

In operation, the web browser application 170 retrieves the third-party content 184 from a third-party content provider, such as the provider 106 depicted in FIG. 1. The web browser application 170 processes the content 184 by parsing the instructions, displaying text and graphics, etc., and executes a call to the mapping API 122. In particular, the web browser application 170 invokes the mapping API 122 to request a digital map of a geographic location specified as part of the content 184. Referring back to FIG. 1, the content 184 can specify the location 10 as a street address, a set of GPS coordinates, or in any other manner.

According to one example implementation, the mapping API 122, when invoked, generates a message to a map server (e.g., the map server 124 of FIG. 2) to retrieve the map data 180. The map data 180 can include vector graphics data interpreted and rasterized at the user device 150, already-rasterized map images, or both. In addition to specifying the geographic location to be included in a digital map, the message according to one example scenario indicates the location of the device 150. The indication can be relatively precise (e.g., GPS coordinates) or only approximate (e.g., the nearest mile). Further, the indication of the geographic location can be indirect, such as the Internet Protocol (IP) address. According to another scenario, the user device 150 cannot determine its current location directly or indirectly, or the user configures the user device 150 to not reveal its current location, but the user chooses to provide his or her authentication information to the map server. Using this authentication information, the map server can estimate a probable location of the user device 150. For example, a probable location of the user device 150 can correspond to the user's home or work location.

When using authentication information, the API 122 need not prompt the user for login and/or password information in each instance. In some implementations, the API 122 can determine whether the user is logged in to the web browser 170 by checking login data stored in the memory 154. If the login data indicates that the user is logged in, the API 122 can proceed to request a digital map specifically for the logged-in user.

In any case, the map server provides the map data 180 for generating a digital map at a zoom level selected in view of the reported or estimated location of the user device 150 and the geographic location for which a digital map is requested. Depending on the implementation, the map server can explicitly specify the zoom level at which the map data 180 is to be displayed using a separate parameter, for example, or implicitly indicate the zoom level by providing only map tiles associated with the zoom level.

With continued reference to FIG. 3, the memory 154 in other embodiments can store instructions that implement another software application capable of invoking the API 122 and displaying an interactive digital map via the user interface 156. For example, the user device 150 can execute a dedicated mapping application, a navigation application, or a shopping guide application, each configured to invoke the API 122, in addition to, or instead of, the web browser 170.

Figure 4:
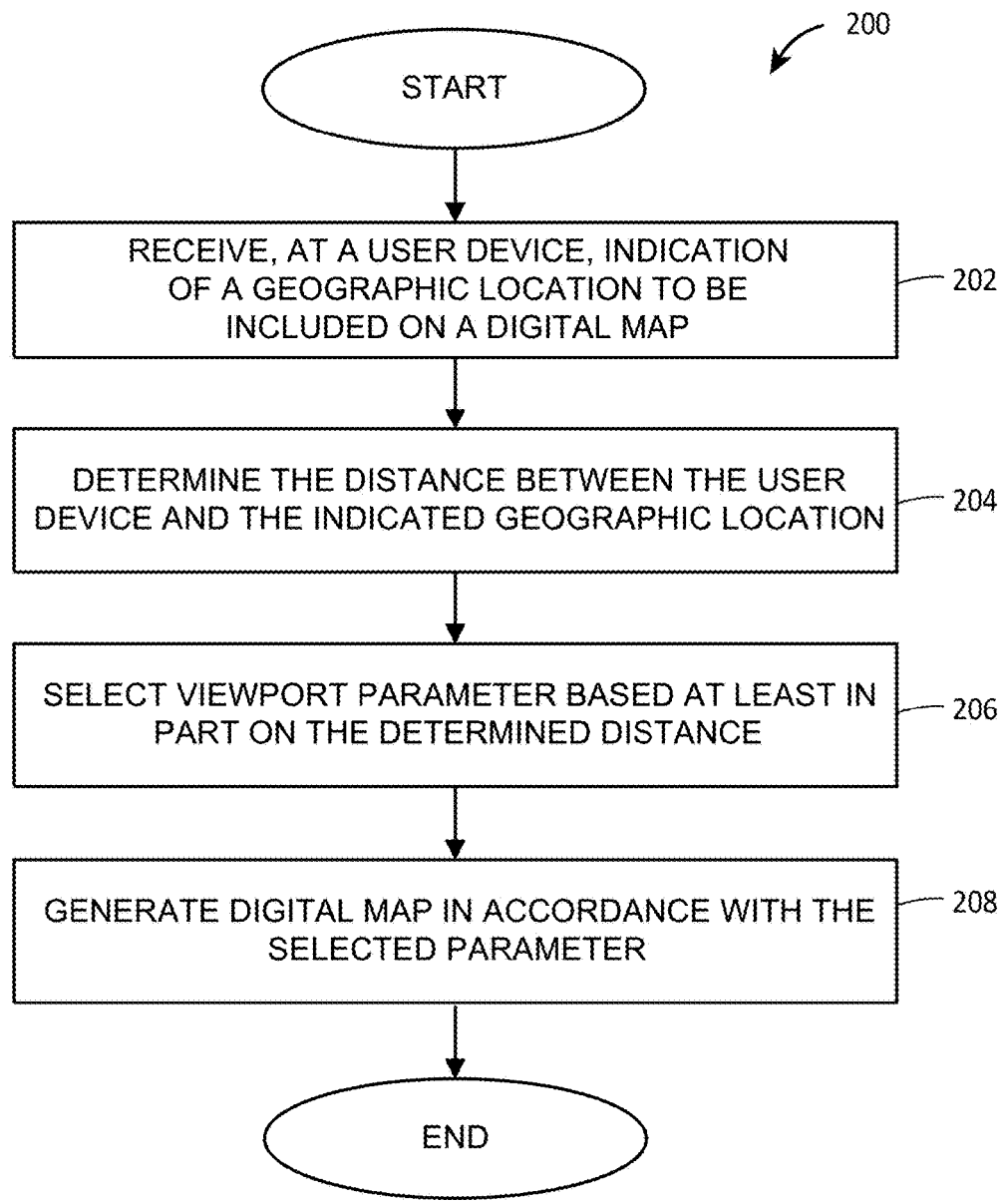
FIG. 4 is a flow diagram of an example method for personalizing a digital map at a user device in view of the distance between the user device and a geographic location on the digital map, which can be implemented in the system of FIG. 2.

As indicated above, some scenarios in which the API 122 provides a digital map within a viewport determined using the techniques of this disclosure do not involve the third-party content provider 106, or any other third-party content provider. Rather, the Example Methods for Controlling Map Viewports in View of User/device Signals Now referring to FIG. 4, an example method 200 for personalizing a digital map at a user device in view of the distance between the user device and a geographic location on the digital map can be implemented in the mapping API 122 and/or the automatic viewport selector 140, for example, and at least partially executed on the user device 150. In particular, the method 200 can be implemented as a set of instructions stored on a non-transitory computer-readable medium and executed by more or more processors.

The method 200 begins at block 202, where an indication of a geographic location to be included on a digital map is received. The indication can be included in a web page received from a content provider, for example.

Next, at block 204, the distance between the user device and the indicated geographic location is determined. In some implementations, the distance is determined only approximately. For example, the distance can be determined to the nearest ten-mile interval. As discussed above, the current location of the user device can be determined using a wireless signal-based positioning technique such as GPS or WiFi triangulation, an approximate positioning technique such as IP address mapping, or by estimating the user's location based on historical data, profile data, time of day, etc.

A viewport parameter then is determined or selected based at least on the determined distance (block 206). The determined distance can be compared to a threshold value, such as radius R illustrated in FIG. 1. More generally, one or multiple radii can be used as threshold values for determining when certain zoom levels should be applied. Further, threshold values can be defined along geometries other than circular geometries. For example, a certain threshold value can correspond to "ten miles along a major highway." Still further, threshold values in some embodiments can be defined in terms of time rather than distance, such as "two hours by car."

The viewport parameter can be the zoom level, for example. In some embodiments, selecting the viewport includes querying a map server. At block 208, a digital map is generated in accordance with the determined map viewport parameter. The digital map can be displayed within a map browser window, in a message application, or in the body of an email, for example.

Figure 5:
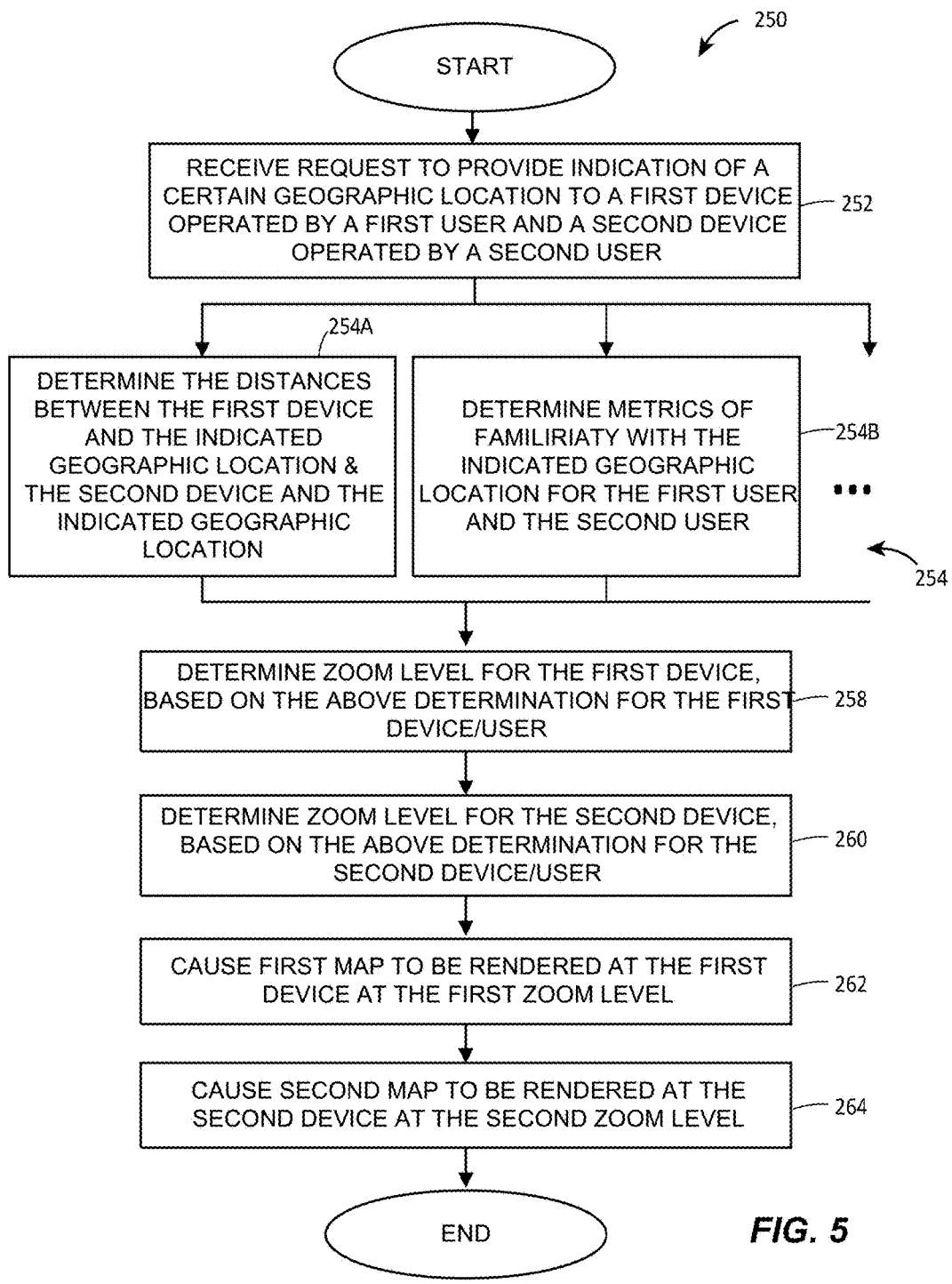
FIG. 5 is a flow diagram of an example method for generating digital maps at two user devices at different respective zoom levels using the API of this disclosure.

FIG. 5 is a flow diagram of an example method 250 for generating digital maps at two user devices at different respective zoom levels using the mapping API of this disclosure. The method 250 can be implemented as a set of instructions in the automatic viewport selector 140, for example. According to the method 250, zoom levels are determined for several user devices. However, a similar method can be used to determine other map viewport parameters.

At block 252, a request to provide an indication of a geographic location to a first user device is received from a second user. Referring back to FIG. 1, for example, the first user can operate device A and the second user can operate device B, and the geographic location can correspond to the location 10. Next, one, several, or all of blocks 254 can be executed to determine zoom levels for the digital maps to be displayed at the first device and the second device. In particular, at block 254A, the distance between the first device and the indicated geographic location and the distance between the second device and the indicated geographic location are determined. At block 254B, respective metrics of familiarity with the indicated geographic location are determined for the users of the first device and the second device. These metrics can be numerical metrics such as percentages, for example. At other blocks 254, such factors as the users' previous requests for navigation directions, geographic searches, preferences and favorite locations, etc. also can be analyzed. These factors can be expressed as numerical metrics and weighed in any suitable manner.

At block 258, a first zoom level at which a digital map of the indicated geographic location should be displayed at the first device is determined based on the determinations at blocks 254A, 254B, etc. Similarly, at block 260, a second zoom level at which a digital map of the indicated geographic location should be displayed at the second device is determined based on these determinations. In some scenarios, different zoom levels are selected at blocks 258 and 260, even though a digital map of the same geographic location has been requested.

At block 262, a digital map of the indicated geographic area at the first zoom level is provided via a user interface of the first device and, at block 264, a digital map of the indicated geographic area at the second zoom level is provided via a user interface of the second device. When the automatic viewport selector 140 of FIG. 2 implements the method 250, the map server 124 can provide map data to the corresponding user devices via a communication network.

Figure 6:
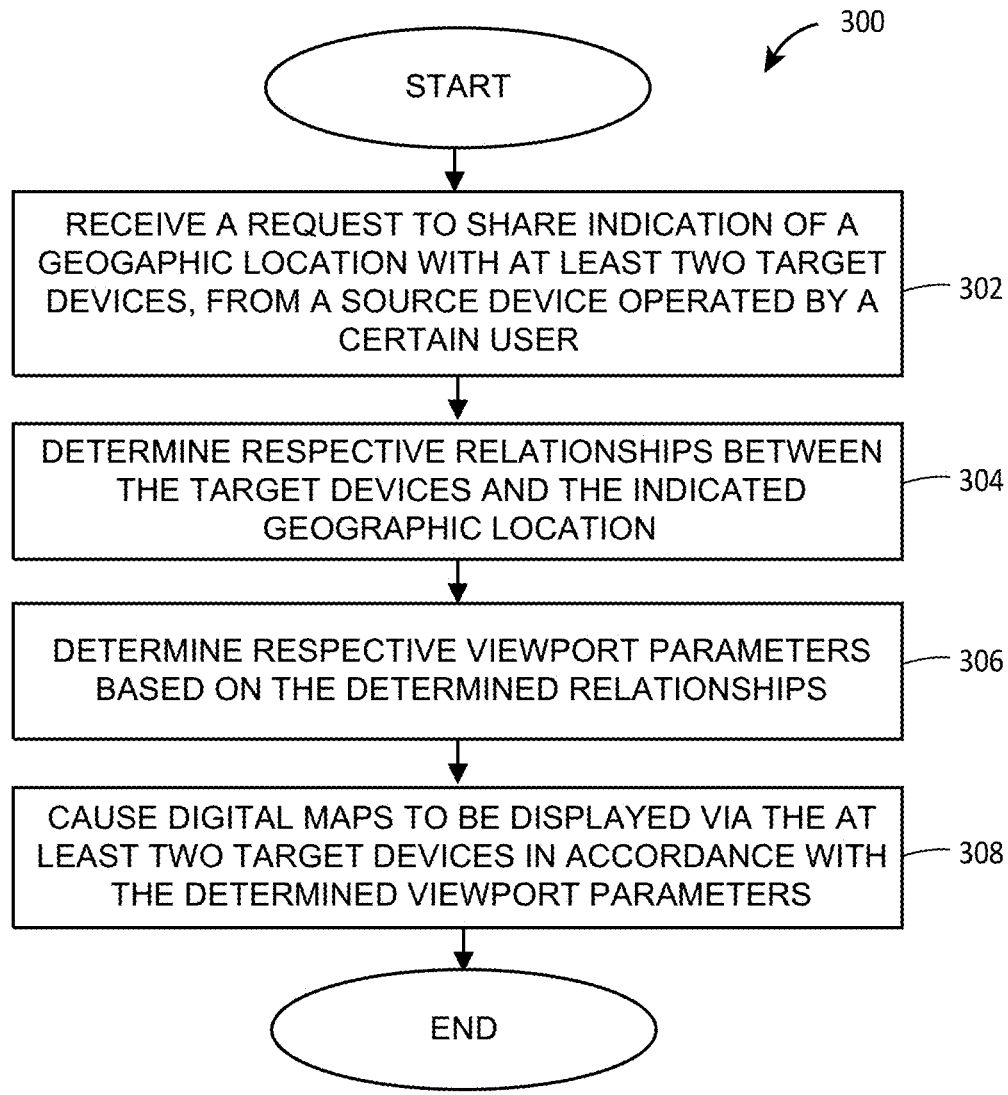
FIG. 6 is a flow diagram of an example method for sharing an indication of a geographic location with multiple user devices, which can be implemented in the system of FIG. 2.

FIG. 6 is a flow diagram of an example method 300 for sharing an indication of a geographic location with multiple user devices, which also can be implemented as a set of instructions executable on one or more processors in the automatic viewport selector 140.

The method 300 begins at block 302, where a request to share an indication of a geographic location with at least two target devices is received from a source device. The respective relationships between each of the target devices and the indicated geographic location are determined at block 304. For example, steps similar to blocks 254 discussed above can be carried out. Respective viewport parameters then are determined based on the determined relationships at block 306, and digital maps are provided to the respective target devices in accordance with the determined viewport parameters at block 308, similar to blocks 262 and 264 discussed above.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The methods 200, 250, and 300 may include one or more function blocks, modules, individual functions or routines in the form of tangible computer-executable instructions that are stored in a non-transitory computer-readable storage medium and executed using a processor of a computing device (e.g., a server, a personal computer, a smart phone, a contained portable device, an attached portable device, a vehicle head unit, a tablet computer, a head mounted display, a smart watch, a mobile computing device, or other personal computing device, as described herein). The methods 200, 250, and 300 may be included as part of any backend server (e.g., a location relay server, or any other type of server computing device, as described herein), attached portable device modules, contained portable device modules, or vehicle head unit modules of the example environment, for example, or as part of a module that is external to such an environment. Though the figures may be described with reference to the other figures for ease of explanation, the methods 200, 250, and 300 can be utilized with other objects and user interfaces. Furthermore, although the explanation above describes steps of the methods 200, 250, and 300 being performed by specific devices, this is done for illustration purposes only. The blocks of the methods 200, 300, and 400 may be performed by one or more devices or other parts of the environment.

The methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for controlling map viewports through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium storing thereon instructions that implement an application programming interface (API) for generating digital maps, wherein the API operates to:
when invoked by a software module executing on one or more processors of a client device, determine a geographic location to be included in a digital map, wherein the geographic location is specified by a server device coupled to the client device via a communication network;
in response to determining the geographic location, determine a distance from a current location of the client device to the specified geographic location;
based at least on the distance from the current location of the client device to the specified geographic location, select a parameter for a viewport of the digital map;
generate the digital map in accordance with the selected parameter, wherein the current location of the client device is not included within the digital map; and
display the digital map via a user interface of the client device.

2. The computer-readable medium of claim 1, wherein the viewport parameter is a zoom level.

3. The computer-readable medium of claim 2, wherein the viewport parameter is a zoom level and wherein the API operates to select a first zoom level for the digital map when the distance is below is a threshold value, and a second zoom level for the digital map when the distance is above is a threshold value, wherein the first zoom level is higher than the second zoom level.

4. The computer-readable medium of claim 1, wherein the server device provides to the client device an electronic document which invokes the API and specifies the geographic location to be included in the digital map as a parameter.

5. The computer-readable medium of claim 4, wherein the electronic document specifies a default value of the parameter, and wherein the API operates to override the default value of the parameter.

6. The computer-readable medium of claim 4, wherein to generate the digital map, the API operates to:

send a request to a map server device via the communication network, and
receive map data for generating the digital map from the map server device;
wherein the map server device operates separately from the server device.

7. The computer-readable medium of claim 1, wherein the API operates to select the parameter further based on an estimated level of familiarity of a user of the client device with the specified geographic location.

8. The computer-readable medium of claim 1, wherein to select a viewport parameter for the digital map, the API provides (i) the current location of the client device and (ii) the specified geographic location to a map data server, via the communication network.

9. The computer-readable medium of claim 1, wherein the API further operates to select, based at least on the distance from the current location of the client device to the specified geographic location, visual styling of map features included in the digital map.

10. The computer-readable medium of claim 1, wherein the API further operates to select, based at least on the distance from the current location of the client device to the specified geographic location, a selection of map layers to be displayed as part of the digital map, the map layers selected from a group including a traffic layer, a transit layer, and a weather layer.

11. A method for generating digital maps, the method comprising:
receiving, by one or more processors, a request to provide an indication of a certain geographic location to a first device operated by a first user and a second device operated by a second user;
in response to receiving the indication of the certain geographic location, determining, by the one or more processors, a first distance between the indicated geographic location and a geographic location of the first device and a second distance between the geographic location and a geographic location of the second device;
based at least in part on the first distance, determining, by the one or more processors, a first zoom level for a digital map including the geographic location and not including the geographic location of the first device;
based at least in part on the first distance, determining, by the one or more processors, a second zoom level for a digital map including the geographic location and the geographic location of the second device; and
causing, by the one or more processors, a first digital map to be displayed via the first device at the first zoom level, and a second digital map to be displayed via the second device at the second zoom level.

12. The method of claim 11, the method further comprising:
generating, by the one or more processors, a first metric of familiarity with a geographic area that includes the geographic location, based on profile data of the first user;
generating, by the one or more processors, a second metric of familiarity with the geographic area, based on profile data of the second user; and
determining the first zoom level and the second zoom level based further on the first metric of familiarity and the second metric of familiarity, respectively.

13. The method of claim 11, wherein causing the first digital map to be displayed via the first device at the first zoom level includes:
generating the first digital map at the first device using a first instance of a mapping application programming interface (API) function, and
generating the second digital map at the second device using a second instance of the mapping API.

14. The method of claim 11, including receiving the request to provide the indication of the certain geographic location from a third device operated by a third user, wherein the geographic location is the location of the third user.

15. The method of claim 11, wherein determining the first zoom level and the second includes:
comparing, by the one or more processors, each of the first distance and the second distance to a threshold value,
selecting the first zoom level in response to determining that the first distance is below the threshold value, and
selecting the second zoom level in response to determining that the second distance is above the threshold value,
wherein the first zoom level is higher than the second zoom level.

16. The method of claim 11, wherein receiving the request to provide the indication of the certain geographic location includes receiving a default zoom level for each of the first device and the second device, and wherein determining the first zoom level and the second zoom level includes overriding the default zoom level.

17. A method for generating digital maps, the method comprising:
receiving, by one or more processors from a source device operated by a location sharing user, a request to share an indication of a certain geographic location with a first target user operating a first target device and a second target user operating a second target device;
in response to receiving the request to share the indication of the certain geographic location, determining, by the one or more processors, a first distance between a current location of the first target user and the indicated geographic location and a second distance between a current location of the second target user and the indicated geographic location;
based at least in part on the first determined distance, determining, by the one or more processors, a first viewport parameter for a first digital map including the indicated geographic location and not including the current location of the first target device;
based at least in part on the second determined distance, determining, by the one or more processors, a second viewport parameter for a second digital map including the indicated geographic location and the current location of the second target device; and
causing, by the one or more processors, a first digital map to be displayed via the first device according to the first viewport parameter, and a second digital map to be displayed via the second device according to the second viewport parameter.

18. The method of claim 17, further comprising:
determining the current location of the first target device using an Internet Protocol (IP) address of the first target device, and
determining the current location of the second target device using an IIP address of the second target device.

19. The method of claim 17, wherein:
determining the first relationship includes determining, by the one or more processors, a first metric of familiarity with a geographic area that includes the geographic location, based on profile data of the first target user, and determining the second relationship includes determining, by the one or more processors, a second metric of familiarity with a geographic area that includes the geographic location, based on profile data of the second target user.

20. The method of claim 17, wherein the first viewport parameter and the second viewport parameter are respective zoom levels.

* * * * *